(12) United States Patent
Hahn

(10) Patent No.: US 8,003,244 B2
(45) Date of Patent: Aug. 23, 2011

(54) BATTERY, ESPECIALLY A MICROBATTERY, AND THE PRODUCTION THEREOF USING WAFER-LEVEL TECHNOLOGY

(75) Inventor: Robert Hahn, Berlin (DE)

(73) Assignee: Fraunhofer-Gesellschaft zur Föerderung der Angewandten Forschung E.V., Munich (DE)

( * ) Notice: Subject to any disclaimer, the term of this patent is extended or adjusted under 35 U.S.C. 154(b) by 1155 days.

(21) Appl. No.: 10/595,290

(22) PCT Filed: Oct. 4, 2004

(86) PCT No.: PCT/EP2004/011058
§ 371 (c)(1),
(2), (4) Date: Jan. 16, 2007

(87) PCT Pub. No.: WO2005/036689
PCT Pub. Date: Apr. 21, 2005

(65) Prior Publication Data
US 2007/0139001 A1 Jun. 21, 2007

(30) Foreign Application Priority Data
Oct. 6, 2003 (DE) .................................. 103 46 310

(51) Int. Cl.
*H01M 2/14* (2006.01)
*H01M 2/00* (2006.01)
*H02J 7/00* (2006.01)

(52) U.S. Cl. ........ 429/129; 429/163; 429/171; 429/185; 429/232; 320/112

(58) Field of Classification Search ........................ None
See application file for complete search history.

(56) References Cited

U.S. PATENT DOCUMENTS
5,314,765 A  5/1994  Bates
(Continued)

FOREIGN PATENT DOCUMENTS
DE  693 27 584  5/1993
(Continued)

*Primary Examiner* — Dah-Wei Yuan
*Assistant Examiner* — Angela J. Martin
(74) *Attorney, Agent, or Firm* — Duane Morris LLP

(57) ABSTRACT

The invention relates to a battery comprising an electrically non-conductive substrate (1) on which it is arranged, in addition to at least one cathode (4), one anode (6), and a separator/electrolyte layer (5) in the form of layers or films that are pre-formed from an electrochemically active or activatable material and optionally a polymer matrix and/or other auxiliary substances, in a corresponding sequence on the substrate (1). The layer thickness of each electrode layer is 10 μm. The inventive battery also comprises at least one current diverter (7) and at least one battery contact (2, 2a, 2b) that are respectively in electrical contact with an electrode. Said battery is characterized in that it comprises at least one first covering layer (8, 16, 17, 21) consisting of a first, electrically insulating material that is stable in relation to the used electrolyte and electrode material and has been deposited from the gas phase or in the form of a liquid or viscous paste. Said covering layer forms an encapsulation element with the substrate and optionally at least one other component, by which means the battery is sealed from the surrounding environment, and is provided with at least one recess (11, 18, 19) that is closed by an electroconductive material and is connected to at least one current diverter (7) of the battery. The invention also relates to a plurality of such batteries on the same substrate, and to methods for producing the cited batteries using wafer-level techniques.

44 Claims, 14 Drawing Sheets

U.S. PATENT DOCUMENTS

Figure 1C:
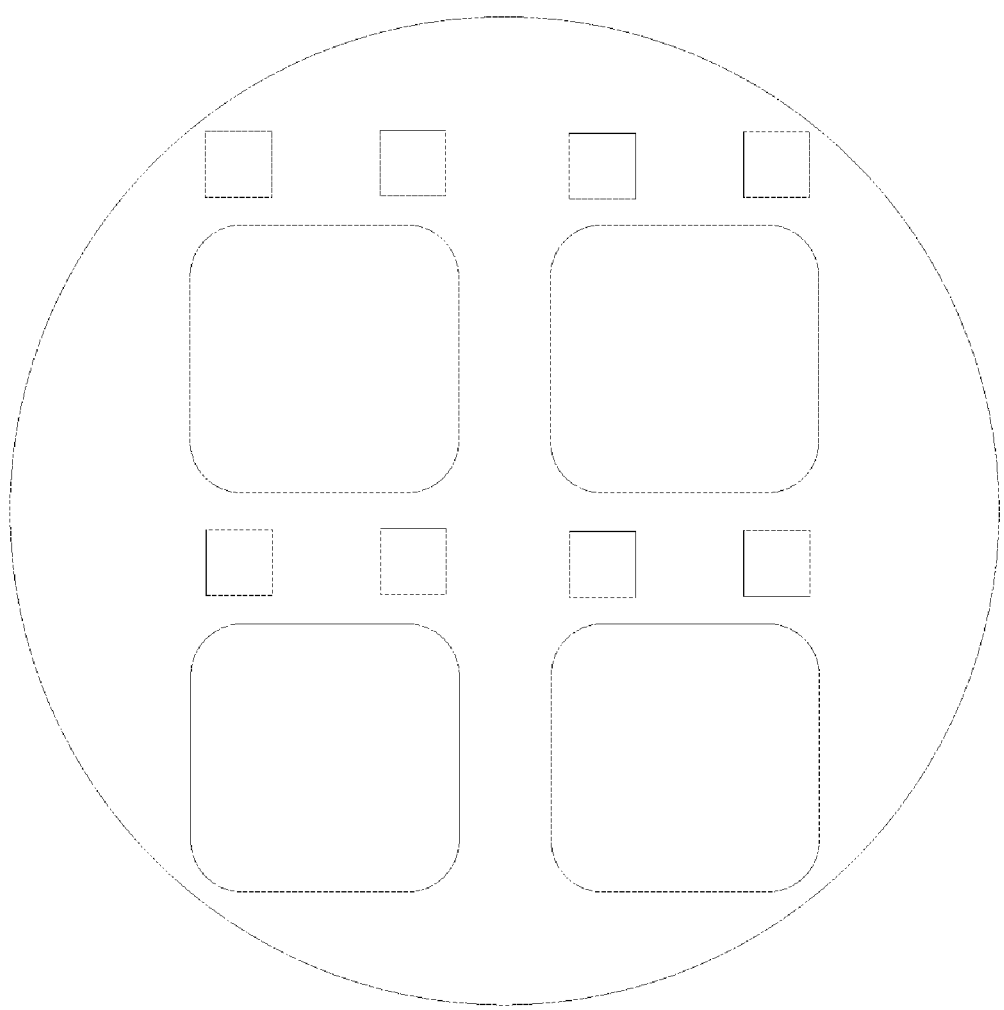

| | | |
|---|---|---|
| 5,445,906 A | 8/1995 | Hobson et al. |
| 5,561,004 A | 10/1996 | Bates et al. |
| 5,643,480 A | 7/1997 | Gustavsson et al. .......... 219/211 |
| 5,654,084 A | 8/1997 | Egert |
| 6,197,450 B1 | 3/2001 | Nathan et al. |
| 6,432,577 B1 | 8/2002 | Shul et al. |
| 6,558,836 B1 | 5/2003 | Whitacre et al. |
| 6,994,933 B1 | 2/2006 | Bates |
| 2002/0071989 A1 | 6/2002 | Verma et al. |
| 2002/0092558 A1 | 7/2002 | Kim et al. |
| 2002/0110733 A1 | 8/2002 | Johnson |
| 2003/0031926 A1 | 2/2003 | Farmer et al. |
| 2003/0160589 A1* | 8/2003 | Krasnov et al. ............... 320/107 |
| 2005/0208373 A1 | 9/2005 | Davis et al. |
| 2006/0204839 A1 | 9/2006 | Richards et al. |

FOREIGN PATENT DOCUMENTS

| | | |
|---|---|---|
| DE | 101 18 639 | 4/2001 |
| DE | 101 47 562 | 9/2001 |
| JP | 01107448 | 4/1989 |
| JP | 2001/266952 | 9/2001 |
| JP | 2002/291176 | 10/2002 |
| JP | 2003/178725 | 6/2003 |
| WO | 93/23968 | 11/1993 |
| WO | 01/73866 | 10/2001 |
| WO | 01/80338 | 10/2001 |
| WO | WO 01/73864 | 10/2001 |

* cited by examiner

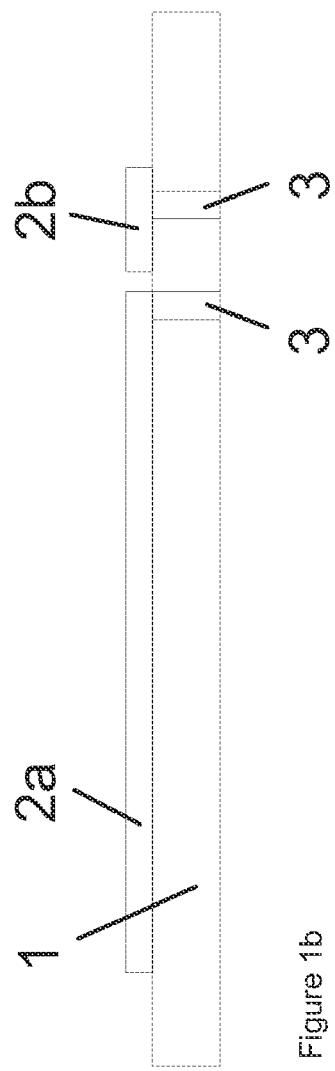
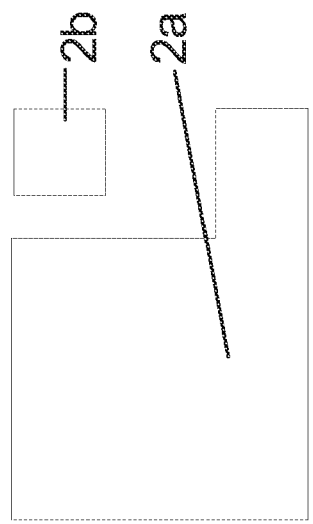
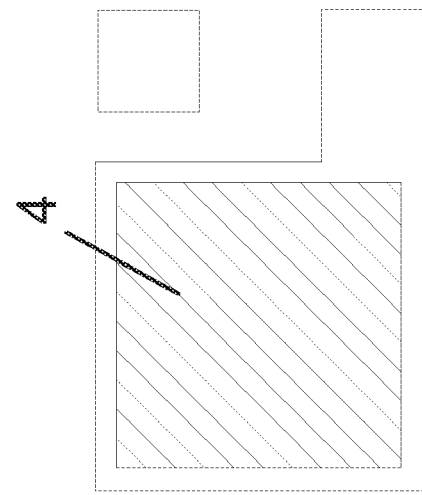
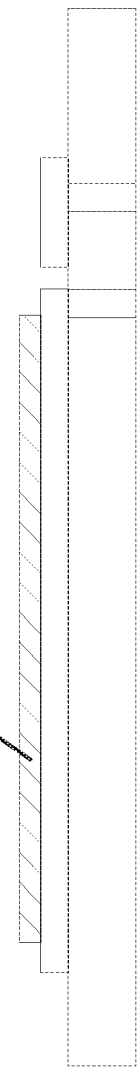

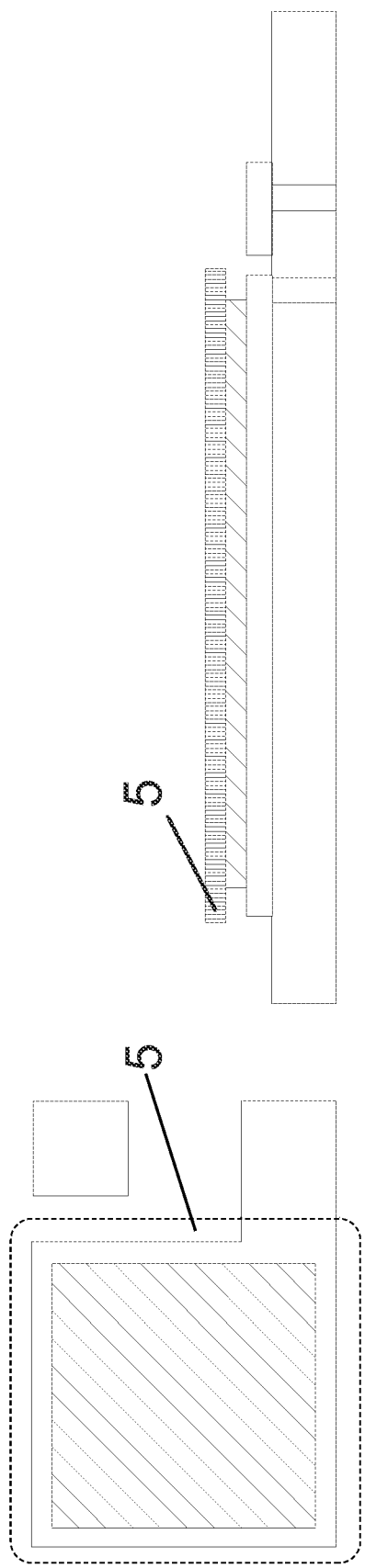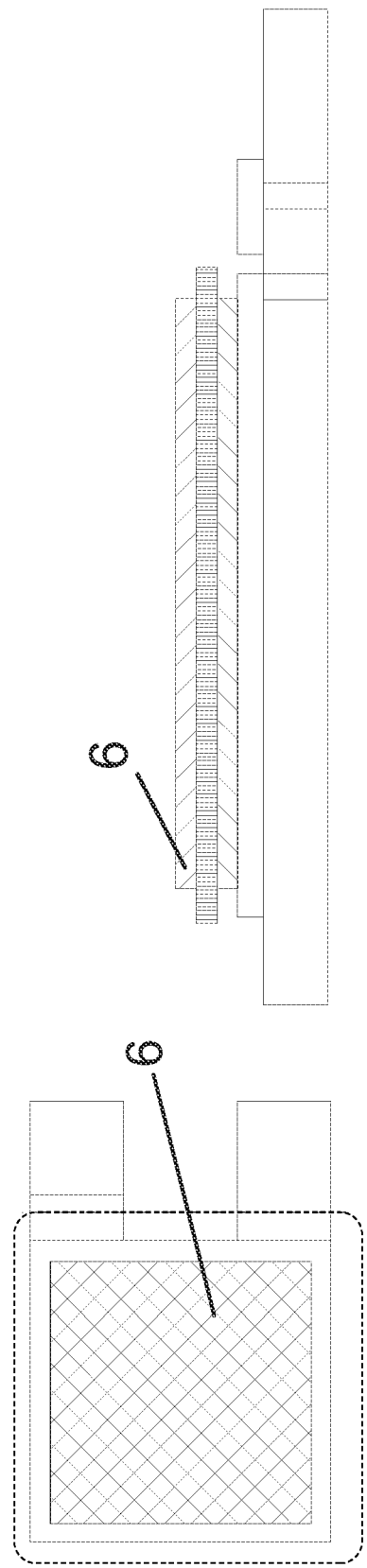

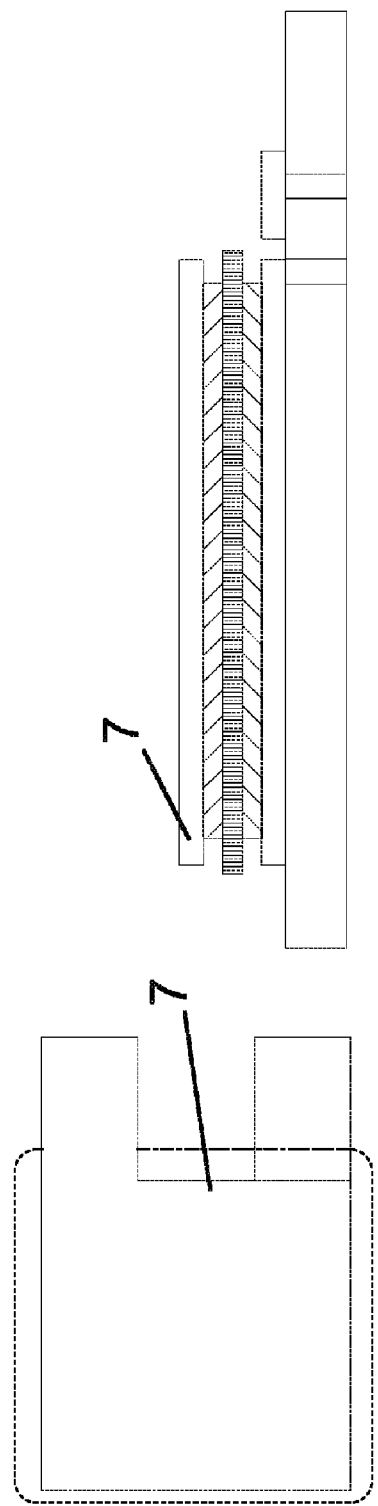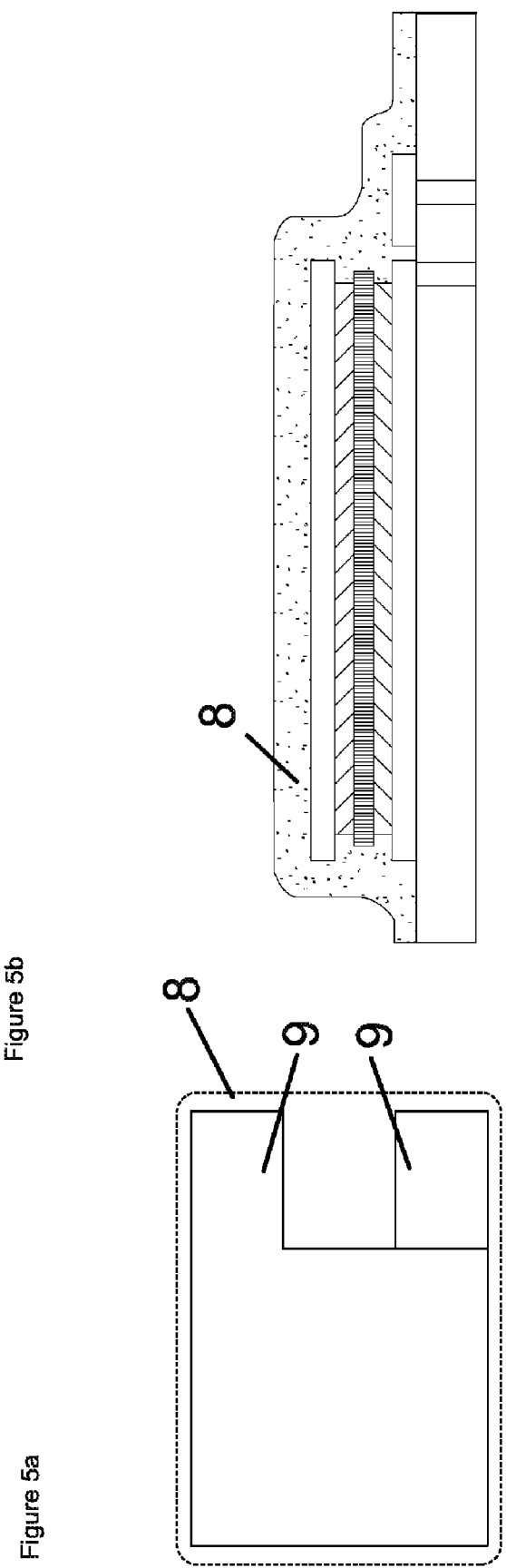

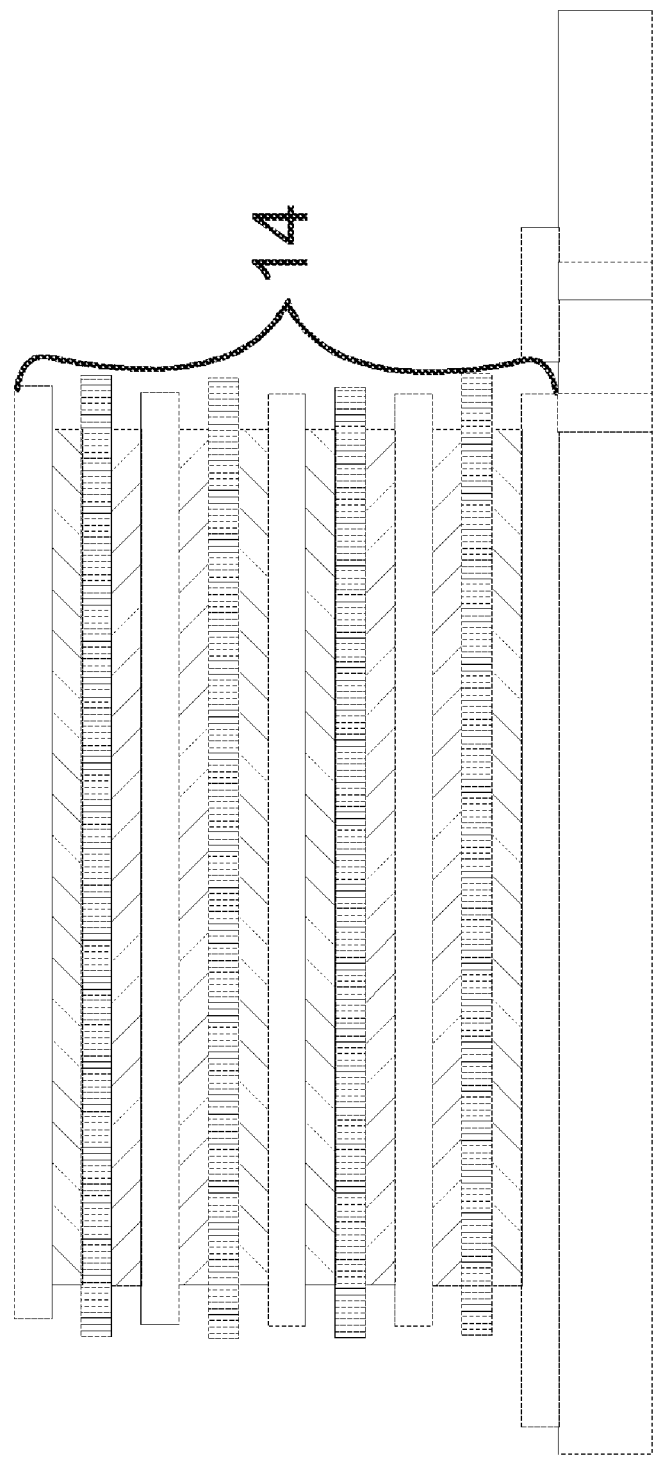

BATTERY, ESPECIALLY A MICROBATTERY, AND THE PRODUCTION THEREOF USING WAFER-LEVEL TECHNOLOGY

The present invention regards micro batteries, i.e. batteries of such small dimensions, that they can be installed on printed boards and electronic circuit elements, as well as methods for their production. The batteries are made of current foil material for cathode, separator/electrolyte and anode and are contacted and encapsulated by means deriving from wafer-level packaging technology.

Microelectronic systems become smaller and smaller. In order to promote the miniaturisation and to reduce costs, complete electronic systems are produced on one chip or such chips are arranged one upon the other in three-dimensional stacks. New applications and functions (electronic grains: eGrain, smart dust and suchlike) are rendered possible if these chips dispose of their own electronic supply. Besides MEMS, that is electronic micro systems with micro mechanic components, sensors, actuators as autonomous complete systems which as a result need a battery adapted in dimensions and parameters, are developed with increasing frequency.

Small batteries with preferably producible dimensions according to the present invention (diameter of less than 10 mm, preferably less than 3 mm, respectively length/width and thickness of between approx. 0.5 and 10 mm or in every dimension) and capacities between preferably approx. 1 and 100 mAh are so far only produced as coin cells. A further miniaturization, however, can't be achieved by means of this technology. With dimensions of a few millimeters the volume related energy density is small also, as the metal casing and the seal need a lot of space. There is no economic integration in micro systems. A direct connection between coin cell and semiconductor chip is not possible. The round sheet casing has a contact on each side and therefore can not simply be connected with an IC.

Li-polymer batteries are usually packed with polymer aluminium composite foils. The polymeric material has to be a thermoplastic substance so that it can be bonded at low temperatures. The seal joint has to be some millimeters broad in order to correspond to density and reliability requirements. In very thin batteries the thickness of this encapsulation has negative impacts on the overall energy density. Every type of battery needs its own sealing tools so that for new types new tools have to be acquired which results in highly increased costs for smaller quantities. JP 2001266952 describes a method for laminating the border regions of Li-polymer batteries. From DE 010147562 A1 a device for sealing flat batteries is known. US 2003/0031926 A1 regards the arrangement of feedthroughs in polymer packages for Li-flat batteries.

A multitude of solutions has been proposed in order to deposit batteries on substrates by means of thin film procedures. PVD, CVD and reactive PVD-methods as well as pattern technologies are used. Therefore very complex new developments have to be carried out and the continued augmentation of energy density in the conventional battery production can't be used. The vacuum technological production of battery layers, in particular of the electrolyte takes very long and therefore is very expensive. Thin film batteries exceed the energy density of today's polymer batteries. The overall energy is low, however, as only very thin batteries (with dimensions of some micrometers) are cycle stable. For larger accumulating capacities many such batteries have to be stacked one upon the other, which leads again to a strong increase in costs. We know a structure of thin film batteries from U.S. Pat. No. 6,558,836. US 2002/0071989 discloses the encapsulation of thin film batteries. U.S. Pat. No. 6,197,450 regards the imbedding of thin film batteries in substrates. US 2002/0110733 and US 2002/0092558 describe multilayer thin film batteries. According to the teaching of WO 01/73866 thin film batteries are deposited by ion-enhanced procedures. No tempering steps are necessary for this method, thus it can be used also for the integration on temperature-instable substrates, e.g. polymer foils.

It has also been proposed to produce micro batteries by means of print methods, for example by ink jet printers, see also WO 01/80338.

In patent literature several descriptions of how to use battery integration with the semiconductor for an effective contacting and connection to the integrated battery management are available. Thus JP 2002/291176 regards the pin configuration of the battery in the IC casing and U.S. Pat. No. 6,432,577 discloses a micro battery completely integrated between two Si-chips, wherein the active masses are in Si-structures in the form of combs. It is sealed by a wafer-bond or by an epoxy gasket.

The object of the invention is to provide batteries with very small dimensions, which have a sealing/encapsulation corresponding to the density requirements of lithium batteries, wherein the sealing respectively encapsulation is supposed to add so little to the overall weight respectively overall thickness of the batteries that the overall energy density respectively capacity per volume respectively weight of the overall battery body reached is substantially not or only hardly influenced by it. The use of tools to produce the encapsulation which have to be newly constructed or changed dependant on the size of the batteries to be produced, should be avoided. The encapsulation should be designed in such way to allow the batteries, if required, to be directly arranged on an electric component or integrated in it. It is however supposed to be suitable for usual foil batteries as well, in particular in lithium technology. In a specific configuration the batteries according to the invention are supposed to be applicable for chip cards which means that their overall thickness has to be of less than 0.6 mm.

The object of the invention is solved by providing a battery including the common battery elements like cathode, anode, separator/electrolyte layer, situated in the form of layers or foils with a single layer thickness of preferably 10 μm or more, which are usually flexible, single or already laminated, self-supporting or extracted from a support carrier, on an electrically non conductive substrate, wherein the electrodes are in contact with a suitably structured current diverter layer. The battery in a first design is characterized in that it has a first covering layer of a first electrically insulating material that is stable in relation to the used electrolyte and electrode material applied from the gas phase or in form of a fluid or viscous paste, and preferably a second covering layer of either a material as defined for the first covering layer or a second electrically conductive material, as for example a metal or an alloy which was also deposited from the gas phase or in form of a fluid or viscous paste, which form(s) together with the substrate und optionally (a) further component(s) an encapsulation through which the battery is sealed respectively insulated from the surrounding environment. In a second design the elements of the battery are situated between the electrically non-conductive substrate and a second substrate and the open border areas between these substrates are closed by the one or both covering layer(s) mentioned above. The covering layer(s) have recesses or openings connecting the current diverters of the battery with the exterior battery contacts.

These recesses or openings are filled with a electrically conductive material, preferably metal and therefore completely sealed.

The single electrode or separator/electrolyte layers or foils consist of an electrochemically active or activable material, as well as if necessary a polymer matrix (e.g. frequent with common foil layers and/or with layers prestructured with print techniques) and/or further auxiliary substances. The expression "electrochemically active or activable material" covers materials which are used as active battery component, that is above all electron-conductive materials for the electrodes and ion-conductive materials for the electrolyte layers. It's not imperative that the "active" or respectively "activable" materials of the separator layers are conductive; these layers comprise or consist of materials permitting the passing through of ion-conductive fluids or respectively of the ions contained within. These materials, too, are covered with the expressions "active" or respectively "activable" materials according to the invention. The electrochemically activable materials are then activated by connecting on the battery.

The best method for applying the covering layer(s) is the so called wafer-level packaging. This means the application of method steps as used mainly in the production and structuring of contact and encapsulation layers on semiconductor chips in the wafer formation, i.e. as discoidal substrate. In particular this covers techniques comprising the application of thin and very thin layers of a fluid phase or gas phase, as coating methods (e.g. spin-on deposition, dip or spray coating of more or less vicious fluids) as well as plasma-, vacuum- and ion-enhanced depositing methods. The layer(s) applied is/are, as far as necessary, provided by means of structuring steps with openings at the spots where the current diverter contacts of the battery are situated. The openings are reclosed by inserting metal or other electronically conductive materials allowing the current conduction between current diverters and exterior battery contacts. If necessary this material can cover larger areas of the covering layers in form of a (structured) coating and thus be used as e.g. contact to further components or as connection of the rectified poles of a multiplicity or plurality of batteries on the same substrate connected parallely or serially.

A quick and easy production of a miniaturized and form-flexible package with optimized power density is rendered possible by combination of the material saving and extremely efficient foil technology in battery production, which has been highly developed and automized during the past years and the processes of wafer-level-packaging for sealing the batteries, which are faster than conventional sealing technology and are form independently applicable in universally applicable devices. In particular as far as plasma-, vacuum- and ion-enhanced procedures are concerned, many materials with very good battery characteristics and very high mechanical stability and adherence can be used.

The present invention made it possible to provide chip-sized micro systems with dimensions of a few mm$^3$ by means of the combination of established battery technologies and integrated casing technology. The already available substrate of the electronic circuit or respectively the semiconductor chip serve at the same time as rear side of the casing. The surface of the casing of the battery is realised by a coating (encapsulation) of only a few μm or for instance by a further substrate for an arrangement in stacks of several batteries or one battery in combination with one or more further elements one upon the other. The substrates can be e.g. Si-chips in form of active semiconductor circuits, partially electrically conductive substrates or substrates with solar cells. If two substrates are present they are contemporaneously used for the encapsulation of surface and rear side of the battery and are closed by a one or multi-layer encapsulation of the border areas between the substrates as described above. Such batteries may be used for instance for the energy supply of a semiconductor switching circuit. A combination of solar cell, battery and semiconductor chip results in a autonomous micro system. The exterior chips and the battery are connected electrically e.g. with an exterior contact structure running perpendicularly to the stack construction. In this case stacks or other arrangements of batteries in stacks one upon the other can be used, wherein the covering of one battery serves as insulating substrate for the next one.

Such a miniaturising has so far been possible only as far as thin film batteries were concerned, which are produced by vacuum technical depositing methods. This technology, however, is very expensive due to complicated procedures and installation technique and has only small capacities, as the thickness of the electrode layer is limited to 1 m, whereas the electrode layers in the batteries according to the invention is at least 10 μm thick and can be realized in wide areas, as the single battery foils can be produced in various thicknesses. Preferably the single layers are up to 50 μm thick, if necessary even more. The covering on the other hand can be kept extremely thin so that the achievable capacities per volume unit of the overall battery are very low.

Figure 3C:
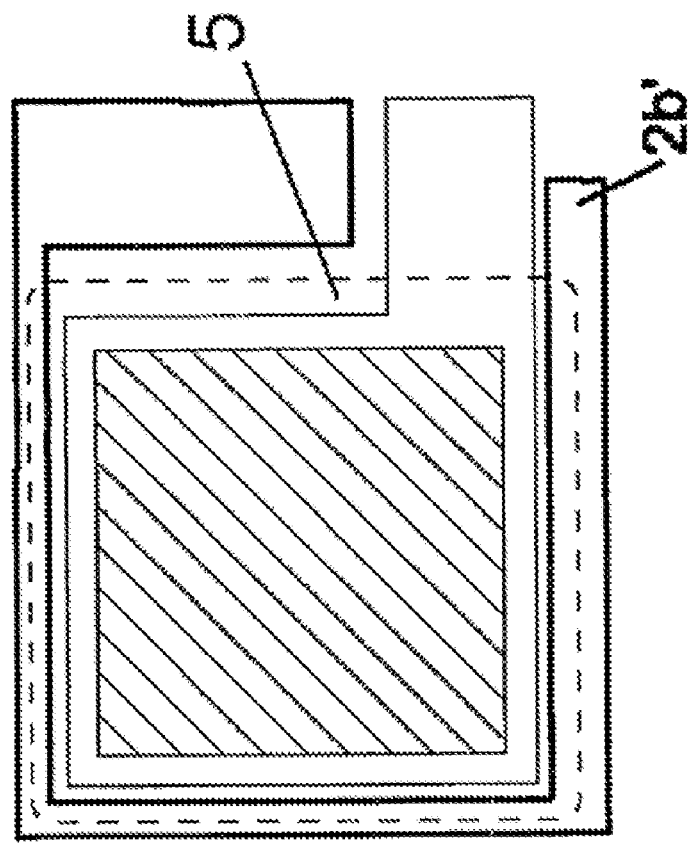
Figure 7A:
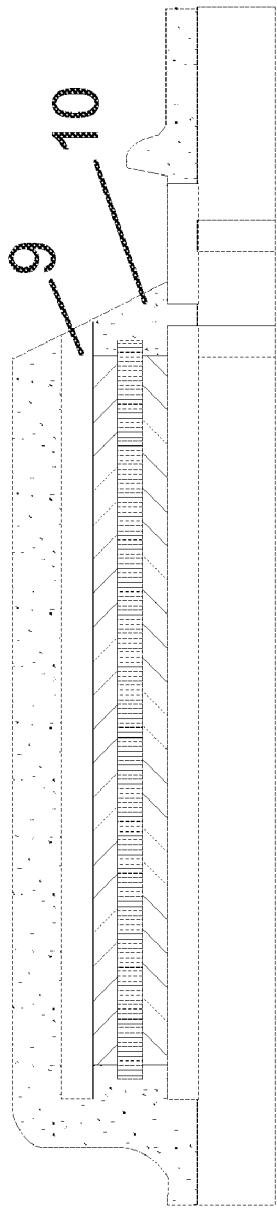
Figure 8A:
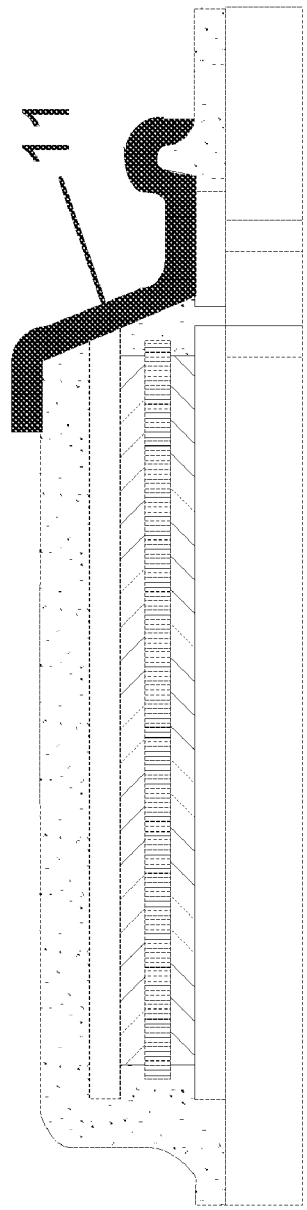
Figure 8B:
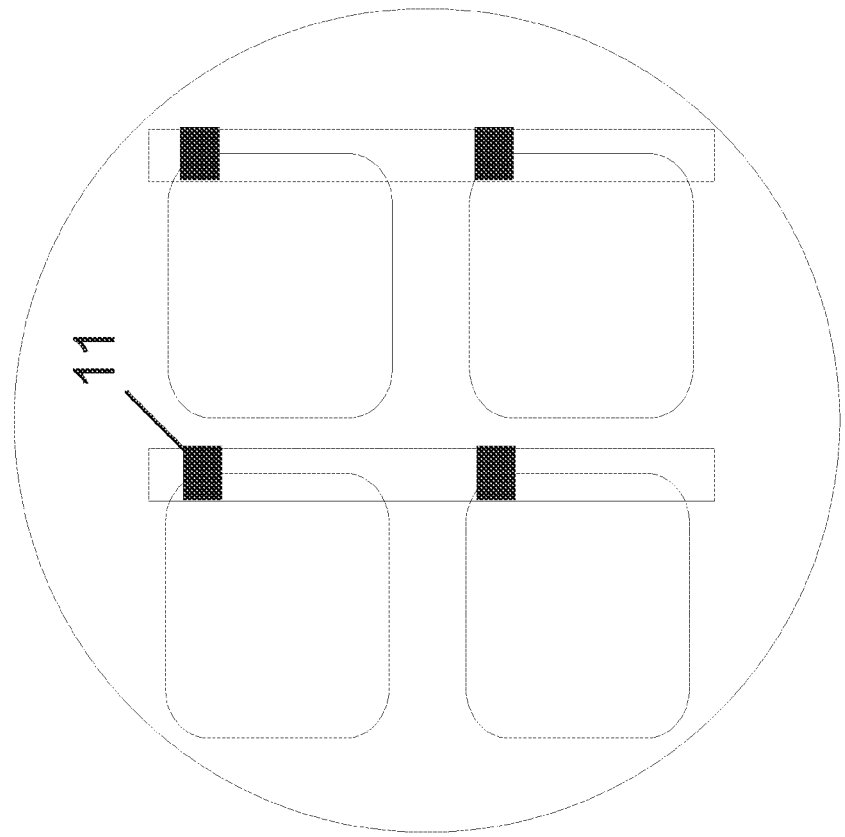
Figure 7B:
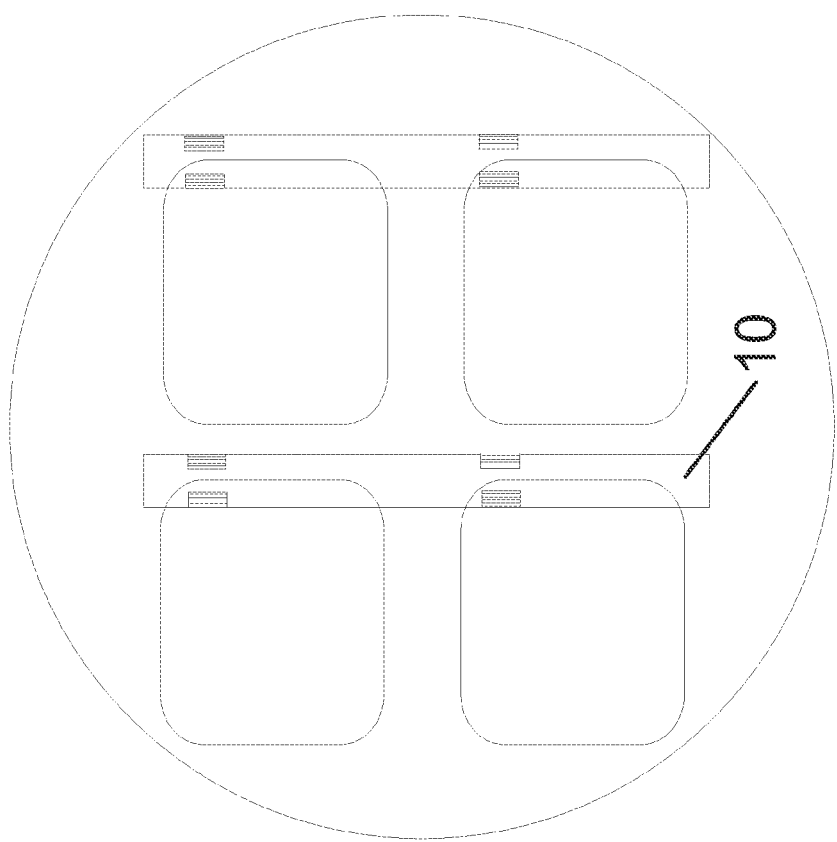
Figure 8C:
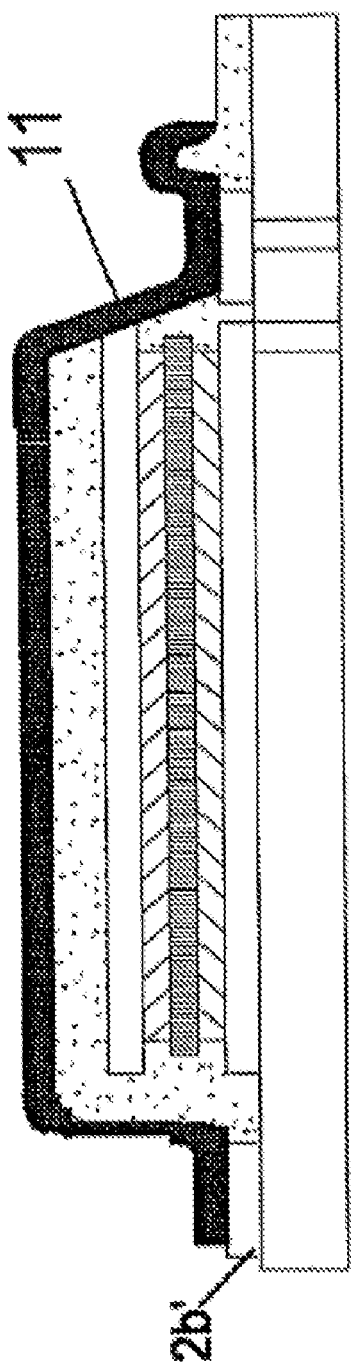
Figure 9B:
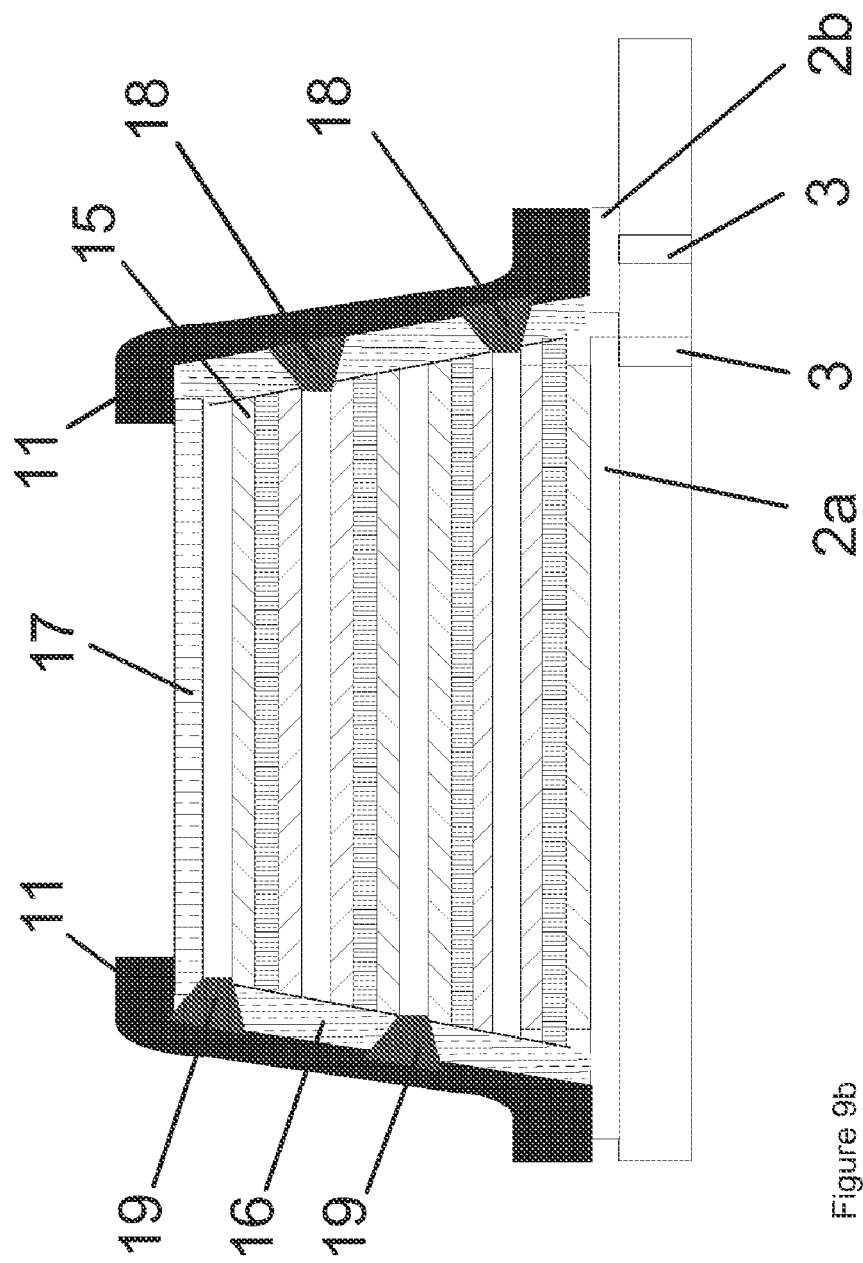

In the following the invention is to be further described by means of figures and design examples, wherein FIG. 1 to 8 present the production of encapsulated batteries in a first design according to the invention, wherein FIG. 1 shows a substrate with hermetic feedthroughs and applied metallization from above (FIG. 1a) and from the side (FIG. 1b), which is to be used as exterior contact for the only one or lowest electrode and therefore as current diverter for the first electrode (if it has no additional current diverter of its own) and is to be used besides as contact site for the transmission of current from the second electrode, FIG. 1c shows how several of such metallizations can be arranged in order to produce a plurality of such batteries on a substrate, FIGS. 2a and 2b show the same substrate as FIG. 1a, 1b with the metallization as well as a first electrode, FIGS. 3a and 3b show the substrate provided with the components according to FIGS. 2a and 2b as well as a separator electrolyte layer, FIG. 3c illustrates a substrate with the same components as shown in FIG. 3a, wherein the contact site for the transmission of current from the second electrode doesn't have the form shown in FIG. 1 but that of a frame which can serve as annular contact for an area covering metallization, FIGS. 4a and 4b show the substrate provided with the components according to FIG. 3a, 3b as well as a counter electrode, FIGS. 5a and 5b show the substrate provided with the components according to FIGS. 5a and 5b as well as a metal foil as upper current diverter, FIGS. 6a and 6b show the substrate provided with the battery components according to FIG. 5a, 5b, covered by an encapsulation layer, FIG. 7a shows the configuration illustrated in FIG. 6a, 6b, the encapsulation layer of which has been structured such that a contact site of the upper current diverter is uncovered, FIG. 7b shows a substrate provided with several battery structures according to FIG. 6a, 6b, with the encapsulation layers of several battery structures opened at the same time, FIG. 8*a* shows the configuration illustrated in FIG. 7*a*, the current diverter contact site of which is occupied with a metal layer, which establishes a contact with the contact site connected to second feedthrough, FIG. 8*b* shows the configuration illustrated in FIG. 7*b* with the open current diverter contacts of all four battery structures covered with a metal layer, FIG. 8*c* shows a variant to FIG. 8*a*, with the metal layer not only existing in the area of the contact site but completely covering the whole battery, FIGS. 9*a* and 9*b* illustrate the production of encapsulated batteries in a second design according to the invention, wherein FIG. 9*a* shows a prefabricated, complete battery foil stack on a substrate, and FIG. 9*b* illustrates the readily encapsulated battery.

Figure 10A:
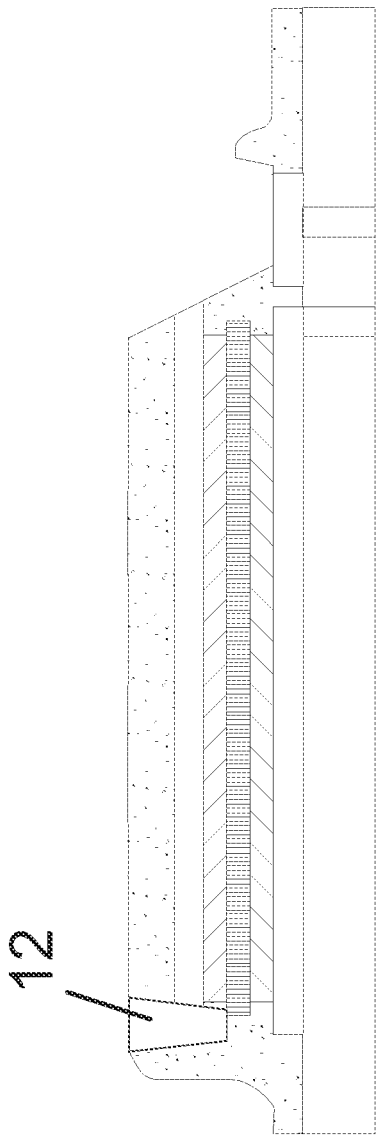
Figure 10B:
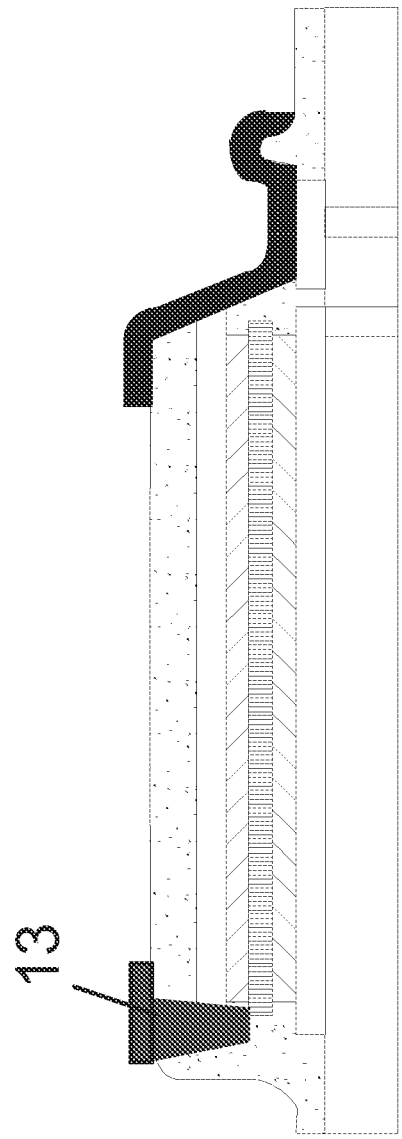
Figure 11:
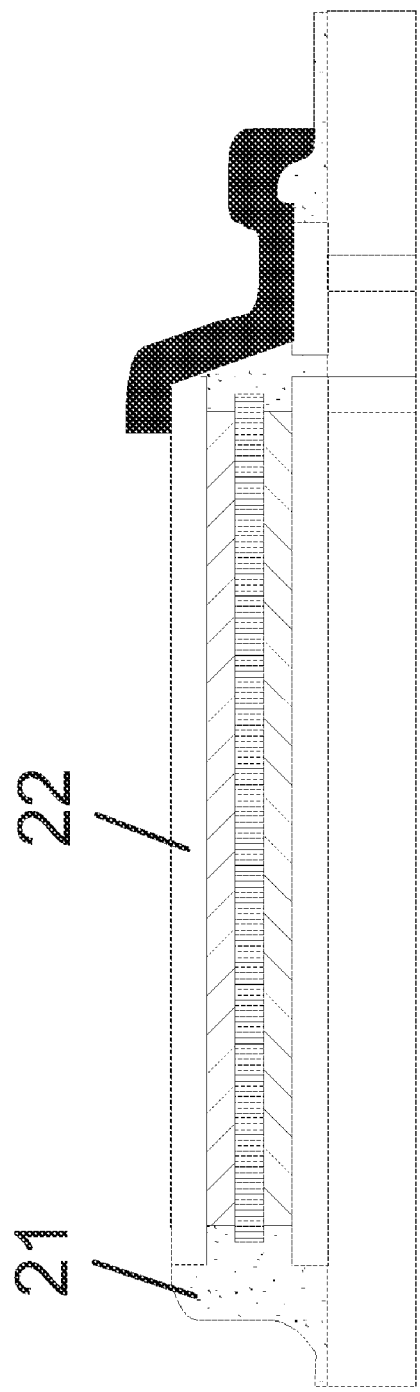
Figure 12:
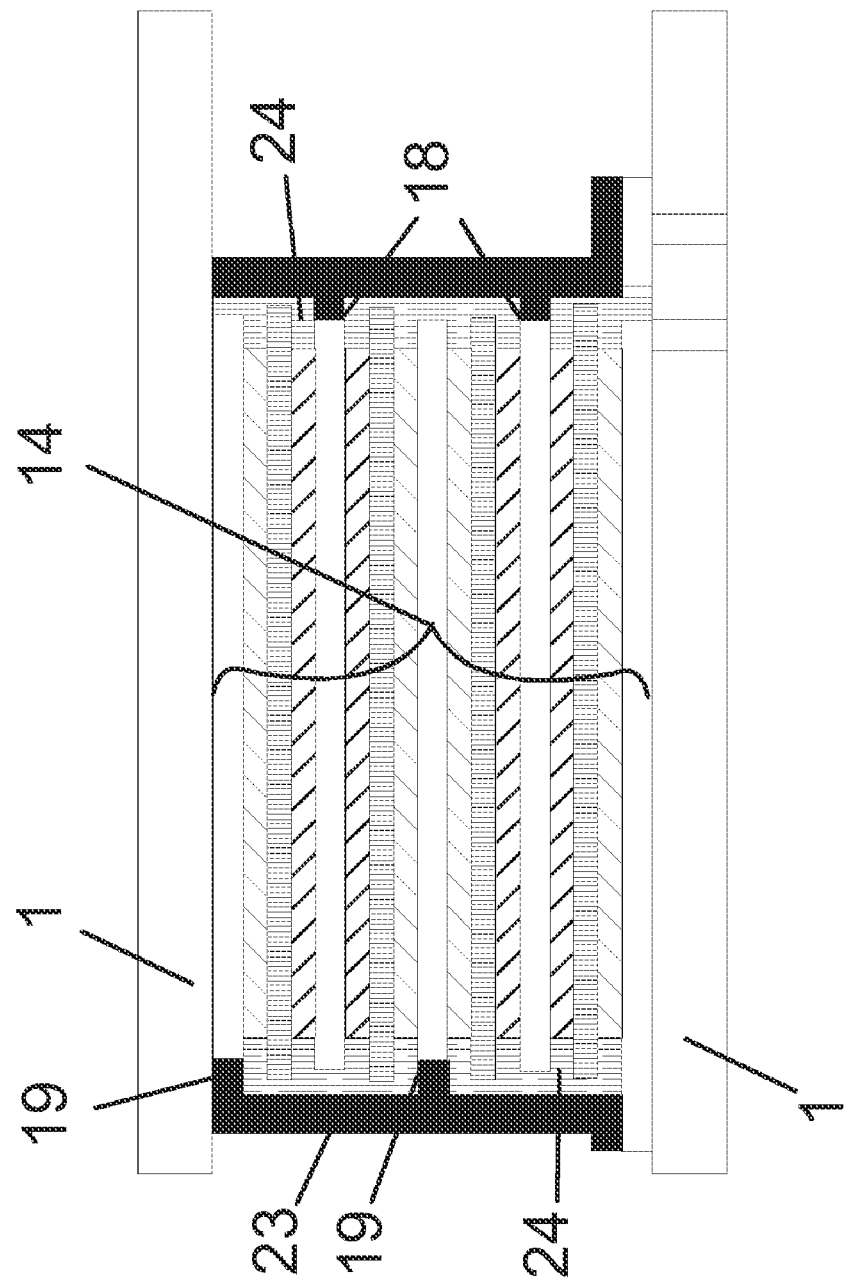
Figure 13A:
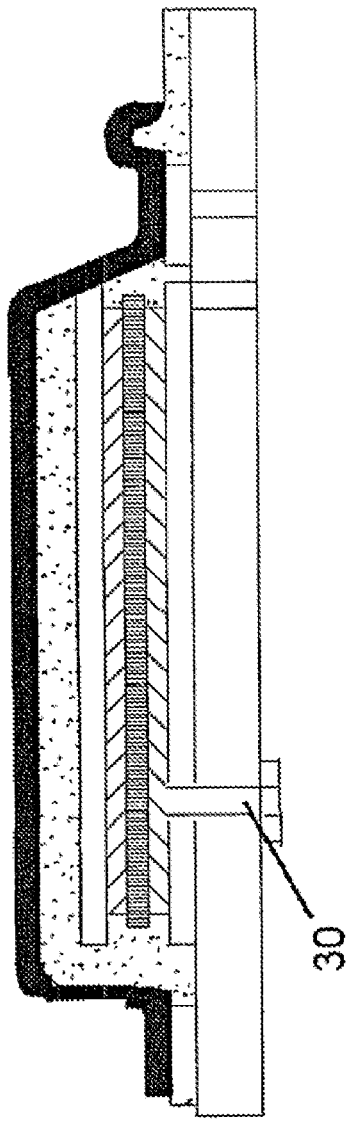
Figure 13B:
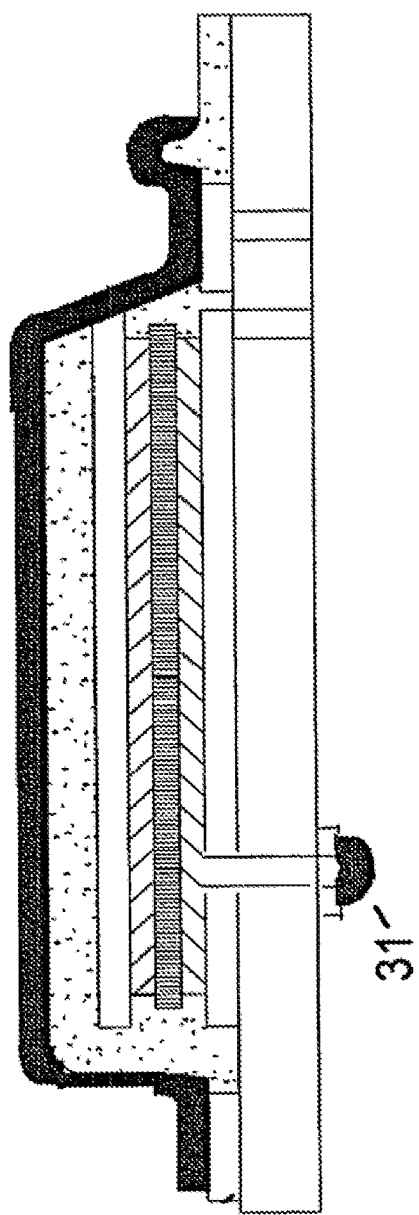

Furthermore the figures illustrate:

FIGS. 10*a* and 10*b* the production of an opening towards the separator/electrolyte foil in the encapsulation for subsequent filling in electrolyte fluid, FIG. 11 a design of the encapsulated battery according to the invention, with the upper current diverter as persistent metal sheet, serving simultaneously as protective covering, FIG. 12 is a battery arranged between two non-conductive substrates according to the present invention, and FIGS. 13*a* and 13*b* an alternative proposition to FIG. 10 for filling in electrolyte fluid via the back side of the battery.

Starting point for the generation of the encapsulated batteries according to the invention is in a first design of the invention a foil battery produced according to the common methods with one or two external current diverters, the active masses of anode and cathode and the electrolyte, for example and preferably a high energy density Li-polymer battery, which can be produced with large area from roll to roll. In a second design, it is started from the individual electrodes and electrolyte layers or foils as well as the current diverters, which are hold on carrier layers or used as self-supporting layers. The latter variant will be described at first in the following in reference to the FIGS. 1 to 8, namely for batteries which are disposed on a substrate and which are provided on their surface as well as laterally with a very thin encapsulation:

In an insulating substrate 1, which can be e. g. a Si-wafer, the system carrier foil of a chip card or a flexible and relatively thin polymer substrate (preferably with a thickness of about 20 to 100 μm), are fabricated battery contacts 2*a*, 2*b* for both poles in form of a metallization, see FIG. 1. The contacts for the further transmission can be designed in any form as needed. The substrate possesses in the illustrated design hermetically sealed feedthroughs 3, for leading the battery contacts through to the other side. Alternatively, these can e. g. be contacts, which lead through a surface insulation of the semiconductor, for contacting on the subjacent wiring, or the contacts can be lead further laterally through conducting channels or metallizations on the substrate surface or can be lead to another component.

The metallization is performed by means of a suitable method of which the one skilled in the art disposes. Examples are sputtering, vapour deposition, galvanic reinforcement. Alternatively, a thin metallic layer can be glued on the substrate. As metal, the one skilled in the art uses the one that would be used in conventional batteries as the diverter in the form of meshes or sheets. The metallization is performed either as a persistent layer, which is structured subsequently or by a directly structuring deposition, e.g. screen printing or a deposition method such as sputtering, vaporization by using suitable patterns.

As is shown in FIG. 1*c*, the metallization can be structured such that a plurality of batteries and their contacts are disposed simultaneously on a substrate, e.g. in a rectangular or symmetrical arrangement as shown. The structuring can be carried out chemically or physically, e.g. by means of wet or dry etching, e.g. reactive ionic etching, or by means of a semi additive method.

In FIG. 2 is shown the next step, in which the first electrode 4 is laminated on the battery contacts. In this design, the battery contact can simultaneously take the function of the lowest current diverter layer, if needed or desired (e.g., if battery elements or electrodes, respectively, are used which are already prelaminated provided with own current diverters), an additional current diverter between the metallization and the first electrode can be present or be deposited. The electrode layer (anode or cathode) can e.g. be deposited on a support carrier resp. carrier foil and as needed be structured already before being deposited in an appropriate manner; it can however as well be self-supporting. The electrode is made from the electrode material which is suitable therefor, as it is known in the state of the art. The electrode material can be present in combination with an organic matrix and/or with different functional additives, e.g. for increasing the conductibility, or, in case of sufficient flexibility of the used inorganic material, without additive. The deposition which has been conducted if necessary on a support carrier can be effected with any method, e.g. by laying on a paste or by means of printing methods. The layer can first be formed as persistent and be subsequently structured as required, e.g. in a plurality of rectangles, as e.g. needed for the example of the FIG. 1 to 8. The structuring is effected e.g. by means of subtractive removal from the support carrier, which can be achieved by means of means of mechanic methods such as scratching, water jet processing, laser processing, chemical etching or the like. Alternatively, the electrode layers can be deposited by means of a printing method such as screen printing immediately in the appropriate form. Subsequently, the electrode is laminated on (or, in more rare cases, adhered with an electrically conductive glue), and the support carrier is, as far as present, removed. In case multiple batteries are disposed on the substrate on the same level, this step is preferably carried out simultaneously with all battery structures. By the term "laminate on" is to be understood first of all a method in which the layers or foils are deposited under pressure and at elevated temperatures on the respective support. Especially if organic thermoplastic polymers are present in the layers, a strong conjunction with the adjacent layers can be formed.

In an alternative design, e.g. chip-sized electrodes are stamped out and (with or without support carrier) are laminated or bonded individually by means of a chip bonder directly on the substrate with current diverter.

FIG. 3 shows the depositing of the electrolyte or respectively the separator electrolyte layer 5. This layer can be a neutral, absorbent material in respect of ionic conduction, which is later filled with electrolyte solution, or it can be a solid electrolyte, which functions with or without additional ion conductive fluid as an electrolyte layer, as known from the art. This layer can either be self-supporting and be structured on the electrode layer 4 after deposition, or a prestructuring is carried out on the support carrier. The methods which can be used therefor are the same as those for the deposition (first of all laminating, if necessary gluing as well) and which can, if necessary, be used for the structuring of the first electrode and which are described in the foregoing for said electrode. Instead of that, also photo-structurable electrolytes can be used, which are deposited all over the surface and are subsequently structured by exposing to light and developing in the size of the individual batteries.

FIG. 4 illustrates the deposition of the counter electrode 6. The fabrication is carried out with the same procedure steps as that of the first electrode. The electrode materials are selected by the one skilled in the art in a suitable manner.

As can be seen from FIG. 5, the deposition of the upper current diverter 7 is carried out subsequently. This can be effected e.g. by laminating on prestructured metal foils, which are, if necessary, again deposited on a support carrier, or by structuring of a persistent, self-supporting layer, or also even structured deposition (vaporization, screen print, and other methods) directly onto the counter electrode. In respect of the last-mentioned methods, it is referred to the description concerning the deposition of the first battery contacts (2a, 2b).

In FIG. 6, the deposition of an encapsulation or, respectively, a passivation layer 8 is illustrated.

Before deposition of the passivation, a drying of the battery substrate can be carried out if necessary in an inert gas oven. The passivation generally is decisive for the reliability and shelf life of the battery. Thus, in the case of Li-ion batteries, no moisture, no oxygen, nitrogen or $CO_2$ may come into contact with the electrodes or the electrolyte. Therefore, the coating has to be such that it possesses a very low permeation rate for these species. Requirements concerning the tightness can in special cases be realized with a single layer; in general, a multiple-layer structure is however recommended, especially a structure consisting of two layers. In the latter case, only the first layer must be electrically insulating, whereas in the further layer stack also metals can be employed.

Of course, every layer of the passivation must be deposited with procedure steps where the substrate temperature is small enough not to compromise the battery. It is in general recommended to substantially maintain a maximum temperature of 80-120° C. and to exceed it only during a short time. However some battery systems are especially designed for higher temperatures and are thus suitable for proceeding temperature up to about 200° C.

Due to the sensitivity of the Li-batteries, the processes described in the FIG. 1 to 5 should all be carried out in the fabrication of such batteries in inert gas conditions or in the vacuum. For wafer processes, the common handling machines and equipment which work under vacuum can be used. As far as the invention shall be applied in less sensitive batteries, these requirements are of course not obligatory.

Since during the first cycles a gassing of the battery can occur, it is recommendable to fill the battery at first with additional fluid electrolyte, if this is provided, then to form under inert conditions (e.g. in the drying room) and to store in the vacuum for eliminating all gas rests and only to encapsulate in subsequence to that. For this purpose, all batteries on a substrate are contacted on with a contact adapter. In primary batteries as well as in secondary batteries a predeterioration of the battery (storage at elevated temperatures) is possible, before the passivation is fabricated. An alternative to this approach is described in relation with the description of the FIG. 10.

For the or at least for the first covering layer, a material must be used which is resistant in relation to the used electrolyte and the used electrodes. The material will be deposited from a more or less viscous, fluid phase or the gas phase. E.g. the vapour deposition of parylene, the plasma polymerization of different inorganic-organic barrier layers, the deposition of $Al_2O_3$, $SiO_2$, $SiO_yN_x$ at relatively low temperatures (recommendable: at or below 80° C.), spin-on deposition, dipping and spray coating of epoxy resins and the UV curing thereof, but also of other materials, which are electrically non-conductive, temperature resistant and structurable, the latter preferably being photo-structurable by means of UV light or other radiation sources.

The first or only passivation or encapsulation layer should possess a good adherence to substrate and battery and have a good mechanical stability and elasticity for being able to absorb extensions which occur due to minor volume changes of the battery in cycling or storing. The thickness of the passivation is advantageously between 1 and about 100 μm, especially preferred between 2 and about 30 μm. Since in many cases it is inevitable that the layers have pores, for inhibiting eventual leaks on the first passivation or encapsulation layer, preferably at least one second layer is deposited. Here, also electrically conductive layers can be used, which can, as described above for the diverter layers, be deposited on the first passivation layer. Preferably, a vaporization with aluminium is carried out, but however also a sputter or other method and/or another metal or a mixture/alloy of metals can be employed. If necessary, a second insulating passivation layer of the above-described materials can be deposited instead. If needed or desired, one or more electrically conductive and/or insulating layer/s can follow. Reasonable is a layer sequence of at first two electrically insulating layers, on which first a metallization and then a finishing polymer layer are deposited.

If the deposition of the hermetic encapsulation is carried out in vacuum, the contact pressure which is favourable for the function of the battery is achieved after the outward transfer by the air pressure.

The encapsulation is carried out preferably by applying of a persistent layer over the lateral and upper surfaces of the battery, so that the encapsulation layer creates together with the substrate a complete and tight encapsulation around the battery elements. In this preferred design, ways must be created subsequently for the contacts. As illustrated in FIG. 7, there are at first fabricated openings in the encapsulation layer, which uncovers the current diverters 9. In case of neat spatial arrangement, only one opening is needed. Therein, it is favourable when the current diverters 9 extend over the battery itself, such that in e.g. a mechanical uncovering of the contacts through the opening 10, which can be carried out by a saw cut or the like, the active areas of the battery can be maintained completely encapsulated.

The opening of the passivation can be carried out by any suitable method. Favourable are for example plasma processes such as reactive ion etching, ion bombardment, wet chemical etching or mechanical methods (milling, wafer saw, water jet) or a processing by means of laser. As the structure is stacked, it is also possible to apply multiple methods one after the other. In this way, e.g. also the uncovering of a major area of the metal in comparison to the insulator layer in an encapsulation which contains a metallic layer can be achieved, for inhibiting electric shorts during fabrication of the contacts. If for example the opening is obtained by a wafer saw or a mill, persistent channels 10 can be formed which open the contacts of even multiple batteries, as is shown in FIG. 7b. In wet or dry etching, a lithography step for the transfer of the contact image is necessary. Here, pattern processes can easily be used, as only two contacts per battery are respectively needed and thus, all tolerances of the justification and dimensions of the individual batteries can easily be compensated.

Over the obtained openings, subsequently an electric contacting on is carried out, as shown in FIG. 8. For that, metals 11 are deposited and structured, which create a conjunction between the current diverter contacts 9 and the real battery contacts 2*a*, 2*b* or 3. This can be carried out by vaporization or sputtering of metals or alloys such as Al, TiW, Cu. The structuring is carried out in a known way, for example by lithography or suspension patterns. Also possible is the bonding of wire bridges.

A better hermiteicity of the encapsulation can be achieved when the battery is encapsulated in a metal layer as completely as possible. For that, as is shown in FIG. 3*c*, not only a contact is applied for the upper electrode in the lower metallization layer on the substrate, but a frame shaped metallization 2*b'* is laid around the metallization 2*a* (FIG. 1). On the electrically insulating passivation layer 8 (FIG. 6) then not only a small contact flag 11 (FIG. 8*a*) for the upper contact is applied, but a complete metallization, which covers all of the battery and which connects with the lower metallization frame 2*b'* at the edge, as shown in FIG. 8*c*. Except the small area of the feedthrough of the lower electrode contact, the battery is almost completely encapsulated in a metal layer, which substantially reduces the permeation rate for gases and fluids of the environment.

In FIG. 9 is illustrated an alternative fabrication of the total system, wherein the electrochemically active elements (anode, electrolyte, cathode), if necessary already together with the current diverters (in FIG. 9 represented as white bars without assigned numbers) are inserted into a prelaminated foil stack. This foil stack is designated as 14 in FIG. 9*a*. The stack is separated into batteries of suitable size, preferably in chip-sized individual batteries, and these are applied on the carrier substrate. This can be carried out by a current method, for example by laminating or gluing. Instead, the foil stack can be deposited all over the surface on the carrier substrate or on the wafer and subsequently be separated into batteries of suitable size, e.g. in chip size. Again, current methods can be employed, for example milling, wafer sawing, water jet processing, laser processing or the like. Herein, it is recommendable that, as far as possible, on at least one battery side, bevelled edges 15 are fabricated. Subsequently, the complete battery stack is encapsulated by means of layer deposition as described above in connection with the descriptions for FIG. 7. For the methods for applying the encapsulation layer(s) as well as the materials which can be applied therefore, the foregoing is to be applied. If necessary, also different materials can be used on the flanks 16 and on the upper surface 17. Thus, the border insulation 16 e.g. can also be carried out through dispensing. In this method, a toric polymer layer is applied from a cannula, which is moved alongside all battery edges. The material is thereby applied such that a complete wetting of the battery border with polymer from the substrate to the upper edge of the battery is achieved. Subsequently, into these lateral encapsulation layers openings are structured as described above, which enable the contacting on of the current diverter foil. Therein, all openings are respectively lying one above the other, which belong to the positive battery contact (18) or negative battery contact (19). Subsequently, the electrical connections between the individual current diverter foils and the battery contacts 2*a*, 2*b*, 3 are fabricated by applying structured metal layers 11, also as described above.

In case the structuring of the contact openings is carried out by means of a pattern lithography, very accurate tolerances should be maintained in direction of the current diverter foils which are lying one over the other. Therefore, a structuring of the chip batteries on the common substrate with high accuracy is favourable. When mounting together batteries on the substrate which have been individual before, very accurate justification precisions must be maintained. Since all batteries can be contacted on at the same side, this tolerance only has to be maintained in one direction. An example: At a thickness of the current diverter foil between 10 and 20 μm and a gradient of slope of the battery of 60°, the justification precision should be better than ±3 μm.

In FIG. 10, a variant of the present invention is represented, in which the electrolyte fluid shall only be filled into the battery when the battery is already encapsulated. As it can be seen from FIG. 10*a*, an opening 12, which reaches to the electrolyte/separator foil, can in this case be fabricated simultaneously with the opening of the contacts (FIG. 7, 10) or if desired also before or after. The closing of the electrolyte opening is carried out after filling with an additional deposition 13 of a polymer or metal, or simultaneously to the deposition of the contact metals 11 (FIG. 8), see FIG. 10*b*. Since the battery in this design of the invention is free of electrolyte fluid and thus of volatile solvents at that moment of the encapsulation, for all foregoing steps, higher process temperatures can be applied. Such temperatures are of course also possible in any case where the battery works absolutely solvent-free, that is, when it is a pure solid battery.

Alternatively, for filling the battery with fluid electrolyte, e.g. a hole 30 can be provided in the substrate 1, which continues through the lower metallization 2*a* (see FIG. 1). This alternative is shown in the FIGS. 13*a* and 13*b*. After the battery has been completely assembled and encapsulated, the electrolyte is filled in from the rear side. The electrolyte spreads through the electrode layer 4 (FIG. 2) and impregnates the separator 5 (FIG. 3) and the upper electrode layer 6 (FIG. 4). Subsequently, the hole is hermetically closed (FIG. 13*b*). This is carried out preferably by soldering, by introducing e.g. a solder ball 31 or a polymer ball coated with solder 31 into the metallized opening and is soldered by a heat impulse. This can be realized e.g. by laser soldering. Due to the short-time introduction of heat, no heating of the battery occurs. By exact dosing of the solder amount, no solder can reach the battery or the electrolyte. Alternatively, a sealing by micro-welding, micro-riveting, or even gluing is possible. Of course two holes can be used as well, wherein the filling is carried out through one hole, whereas the air can escape through the other hole.

FIG. 11 shows an alternative structure. In this design, the upper current diverter foil has the form of a persistent metal sheet, which is simultaneously used as upper encapsulation. Solely, an electrically insulating encapsulation 21 must be applied on the edge. This can be carried out by dispensing or all other cited methods (FIG. 6, FIG. 9).

In FIG. 12, a stacked structure, consisting of a battery 14, which is disposed between two substrates 1, is represented. The battery in this figure has multiple layerings; of course also a battery with only one electrolyte foil with two electrodes is possible. The substrates can be for example Si-chips in the form of active semiconductor circuits, partially electrically conductive substrates or substrates with solar cells. The substrates serve for encapsulation and are closed by an encapsulation of the border area between the substrates, as described in the foregoing for batteries which are uncovered at the top. Therefore, it is referred to the foregoing descriptions concerning the encapsulation with an encapsulation layer 24, the methods and materials employed therein and those concerning the opening and re-closing of the encapsulation layer(s). The openings 18, 19 filled with metal serve for the contacting on of the individual current diverter foils. Such batteries can for example serve for the energy supply of semiconductor circuits. The combination of solar cell, battery and semiconductor chip results in an autonomous micro system. The electrical connection between the external chips and the battery can be carried out through an external contact structure 23 which is perpendicular to the stack structure.

The invention claimed is:

1. A battery arranged on an electrically non-conductive substrate comprising at least one cathode, one anode, and a separator/electrolyte layer in the form of at least one of layers and foils that are preformed using an electrochemically active or activable material, in corresponding sequence on the substrate, wherein a layer thickness of each electrode layer is >10 μm, at least one current diverter and at least one battery contact that are respectively in electrical contact with an electrode:

wherein the battery comprises at least one first covering layer consisting of a first electrically insulating material that is stable in relation to the used electrolyte and electrode material and has been deposited from at least one of a gas phase and a liquid or viscous paste, the covering layer forming an encapsulation with at least one of (a) the substrate and (b) the substrate together with at least one other component, by which the battery is sealed from the surrounding environment, wherein the deposited electrically insulating material is provided with at least one opening that is filled and closed by an electrically conductive material connected to at least one current diverter of the battery.

2. A battery according to claim 1, which comprises on top of the first covering layer a second covering layer of either a material as defined for the first covering layer or a second electrically conductive material which was also deposited from the gas phase or in the form of a liquid or viscous paste.

3. A battery according to claim 2, comprising a first, a second, and a fourth covering layer made of a first electrically insulating material that is stable in relation to the used electrolyte and electrode material, deposited from the gas phase or in the form of a liquid or viscous paste, and a third covering layer made of a second electrically conductive material which was also deposited from the gas phase or in the form of a liquid or viscous paste, wherein the first material of the first, second, and fourth covering layer can be similar or divers.

4. A battery according to claim 1, characterized in that the battery is covered by a second electrically non-conductive substrate as further component in such a manner that the open border regions between these substrates are sealed by the covering layer(s).

5. A battery according to claim 1, characterized in that the battery is covered by a current diverter in the form of a persistent metal sheet as further component in such a manner that the open border regions between the substrate and the current diverter are sealed by the covering layer(s).

6. A battery according to claim 1, characterized in that the substrate or the substrates is/are (a) silicon wafer, the system carrier foil of a chip card or (b) flexible polymer substrate(s).

7. A battery according to claim 1, characterized in that at least the upper or top current diverter has the form of a flexible prefabricated foil.

8. A battery according to claim 1, characterized in that the battery contact positioned on the substrate has the form of a metallization or of a metallic layer glued on the substrate.

9. A battery according to claim 8, characterized in that the metallization or metallic layer is structured in such a manner that it forms beside the mentioned battery contact a second, from the mentioned battery contact separated battery contact for the counter electrode which is outside the encapsulation and that the substrate optionally has feedthroughs which lead away from both battery contacts through the substrate.

10. A battery according to claim 9, characterized in that the material of the at least one opening sealed with an electrically conductive material is in conductive contact by means of a layer of electrically conductive material with the second battery contact or that this material is a component of the mentioned layer made of electrically conductive material which is in conductive contact with the second battery contact.

11. A battery according to claim 1, characterized in that the electrically conductive material with which the opening(s) are sealed, is a metal or metal alloy.

12. A battery according to claim 1, characterized in that the first electrically insulating material of the covering layer is selected from parylene, non-conductive inorganic-organic polymeric materials with battery properties, $Al_2O_3$, $SiO_2$, $SiO_yN_x$, and epoxy resins.

13. A battery according to claim 8, characterized in that the second battery contact is formed as frame-shaped metallization which is laid around the first battery contact, and that the mentioned electrically conductive material covers the complete battery and is in persistent contact with the metallization.

14. A battery according to claim 1, further comprising an entry channel to the separator/electrolyte layer which extends through the substrate and is sealed or can be sealed from the surrounding environment.

15. A battery according to claim 1, characterized in that the battery comprises a multiple sequence of electrodes and separator/electrolyte layers in the form of flexible prefabricated foils made of electrochemically active or activable material, wherein each a current diverter is positioned between two rectified electrodes and a separator/electrolyte layer is positioned between two counter directed electrodes, and wherein all current diverters which are in contact with the electrodes of equal polarity, are in contact with a recess respectively which is sealed with an electrically conductive material, and wherein the recesses are in conductive contact with structured metallizations in such a manner that a conductive contact is present between each the electrically rectified current diverters and one of two battery contacts and/or one of two feedthrough(s) which lead away through the substrate.

16. A plurality of batteries according to claim 1, characterized in that each battery is positioned on the same electrically non-conductive substrate.

17. A plurality of batteries according to claim 16, characterized in that the electrodes, electrolyte layers and current diverters of each battery are arranged in the same plane.

18. A battery according to claim 1 located in a system with independent energy source positioned on a silicon wafer or chip, characterized in that the electrically non-conductive substrate of the at least one battery is part of the silicon wafer or chip.

19. A battery according to claim 18, wherein the system further comprises at least one solar cell, which is preferably positioned on the opposite side of at least one of the substrate(s).

20. Method of manufacturing a battery comprising the following steps:
(i) Providing a substrate,
(ii) Applying a battery contact layer on the substrate,
(iii) Applying an electrode layer, in a layer thickness of $\geq 10$ μm
(iv) Applying a separator/electrolyte layer on the electrode layer,
(v) Applying a counter electrode layer on the separator/electrolyte layer, in a layer thickness of $\geq 10$ μm, wherein the electrode and separator/electrolyte layers are applied in the form of at least one of layers and foils that are preformed using an electromechanically active or activatable material, (vi) Applying a current diverter layer, wherein the steps (ii) to (vi) can be performed at least one of subsequently and simultaneously and wherein at first step (ii) and then at the same time steps (iii) to (vi) may be performed, or wherein at first step (ii) is performed and then the steps (iii) to (vi) are repeated several times simultaneously or subsequently, (vii) Applying a first covering layer consisting of a first electrically insulating material that is stable in relation to the used electrolyte and electrode material from a gas phase or in the form of a liquid or viscous paste in such a manner that the covering layer, together with at least one of (a) the substrate and (b) the substrate in combination with further component(s), forms an encapsulation through which the battery is sealed from the surrounding environment, (viii) Removing material of the covering layer in such a manner that at least one persistent opening is formed which uncovers at least one current diverter of the battery, and (ix) Sealing the opening with an electrically conductive material in such a manner that the electrically conductive material comes into contact with at least one current diverter of the battery.

21. Method according to claim 20, characterized in that a structured layer of electrically conductive material is deposited on the at least one opening which is sealed with electrically conductive material in such a manner that this material forms a conductive contact between the opening or those openings which are in contact with the current diverters with counter polarity of the battery contact, and the separated battery contact.

22. Method according to claim 21, wherein the steps (iii) to (vi) are performed at least one of simultaneously and subsequently several times in such a manner that each current diverter is positioned between two rectified electrodes and a separator/electrolyte layer is positioned between two counter directed electrodes, wherein the removal of material of covering layer according to step (viii) is performed in such a manner that substantially all current diverters of the battery are uncovered, so that subsequently all recesses can be sealed according to step (ix) with an electrically conductive material and that a conductive contact between all current diverters which are in contact with electrodes of equal polarity, and the corresponding battery contact, and/or one of both feedthroughs is achieved.

23. Method according to claim 22, characterized in that the sealing of the recesses and the manufacture of a conductive contact is performed in subsequent steps or in a single step by applying a structured metallization.

24. Method according to claim 20, characterized in that the battery contact layer is deposited by deposition of metal from the gas phase and especially by vacuum deposition.

25. Method according to claim 24, characterized in that the battery contact layer is deposited in a structured manner or is structured after its deposition so that it forms beside the mentioned battery contact a second battery contact for the counter electrode which is separated from the mentioned battery contact, which is outside the encapsulation, wherein as substrate a substrate is used which has feedthroughs which are arranged in such a manner that they lead away from both battery contacts through the substrate.

26. Method for manufacturing a plurality of batteries comprising the following steps:
(i) Providing a substrate,
(ii) Applying, per battery, a structured battery contact layer with two contacts, (iii) Applying, per battery, a structured electrode layer with each an electrode surface, the electrode layer having a thickness of $\geq 10$ μm, wherein the electrode and separator/electrolyte layers are applied in the form of at least one of layers and foils that are preformed using an electrochemically active or activatable material, (iv) Applying, per battery, a structured separator/electrolyte layer with a separator/electrolyte surface in such a manner that said layer at least one of (a) substantially covers the electrode surfaces of the layer of step (iii), (b) exactly covers the said electrode surfaces, and (c) slightly extends slightly over said electrode surfaces, (v) Applying, per battery, a structured counter electrode layer with an electrode surface in such a manner that said layer at least one of (a) substantially covers the separator/electrolyte surfaces of the layer of step (iv), (b) exactly covers the separator/electrolyte surfaces, and (c) forms a slight recess in comparison to the separator/electrolyte surfaces, the counter electrode layer having a thickness of $\geq 10$ μm, (vi) Applying, per battery, a structured current diverter layer with a current diverter surface in such a manner that the layer at least one of (a) substantially covers the underlying electrode surface, (b) exactly covers the underlying electrode surface, and (c) slightly extends over the underlying electrode surface, wherein the steps (ii) to (vi) can be performed at least one of subsequently and simultaneously or wherein at first step (ii) and then at the same time steps (iii) to (vi) may be performed, or wherein at first step (ii) is performed and then the steps (iii) to (vi) are repeated at least one of several times simultaneously and subsequently, (vii) Applying a first covering layer of a first electrically insulating material that is stable in relation to the used electrolyte and electrode material from a gas phase or in the form of a liquid or viscous paste in such a manner that the covering layer form, together with at least one of (a) the substrate and (b) the substrate in combination with one or more further components, a separate encapsulation for each battery through which the batteries are sealed from the surrounding environment, (viii) Removing material of the covering layers in such a manner that at least one persistent opening is formed per battery which uncovers at least one current diverter of the battery, and (ix) Sealing of the openings with an electrically conductive material, in such a manner that the electrically conductive material of each recess comes into contact with at least one current diverter of the corresponding battery.

27. Method according to claim 20, characterized in that a part of or all steps (iii) to (vi) are performed by depositing prestructured materials which are provided on a support carrier.

28. Method according to claim 27, characterized in that the prestructured materials are deposited on the support carrier by means of a printing method or by means of lithographic methods and etching methods or were structured on the support carrier by means of methods such as laser structuring, water jet processing or mechanical removal.

29. Method according to claim 26, characterized in that the removal is performed mechanically by generating persistent channels, wherein each channel uncovers simultaneously several current diverters.

30. Method according to claim 20, characterized in that a part of or all steps (iii) to (vi) are performed by applying persistent layers which are structured after the application.

31. Method according to claim 30, characterized in that the structurings are performed by means of lithographic methods, etching methods and/or pattern processes.

32. Method according to claim 30, characterized in that the persistent layers are applied lying on a support carrier and then this is removed.

33. Method according to claim 30, characterized in that the materials of the layers are self-supporting foils.

34. Method according to claim 20, wherein the layers are laminated on.

35. Method according to claim 24, characterized in that the structuring of the battery contact layer is performed by means of a mechanical method such as water jet processing, by laser processing, chemically by chemical etching, by galvanic methods and/or by means of patterns.

36. Method according to claim 20, characterized in that prior to applying the first covering layer a drying is performed in an inert gas oven or under vacuum.

37. Method according to claim 20, characterized in that the separator/electrolyte layer and if necessary the electrode layers are filled with electrolyte fluid and the battery is formed prior to encapsulation.

38. Method according to claim 20, characterized in that besides the removal of material of the covering layer(s) according to step (vii) for uncovering of at least one current diverter further material is removed from this/these layer(s) in such a manner that an uncovering of the separator/electrolyte layer is performed, wherein the uncovered separator/electrolyte layer is filled with electrolyte fluid and the recess(es) formed by the removal is/are then sealed again.

39. Method according to claim 20, characterized in that the separator/electrolyte layer is filled with electrolyte fluid via a channel in the substrate and then the channel is sealed whereupon the battery is formed.

40. Method according to claim 20, characterized in that the removal of material of the covering layer(s) according to step (vii) is performed by means of plasma-enhanced methods, especially reactive ion etching or ion bombardment, by wet-chemical etching, by laser processing or by a mechanical method such as sawing, milling or water jet processing, wherein the etching methods comprise a lithography step for transferring the contact image.

41. Method of manufacturing a battery according to claim 20, characterized in that by means of the method according to claim 26 a plurality of batteries is manufactured and that these are then isolated by separating the substrate between the batteries.

42. A plurality of batteries according to claim 16 located in a system with independent energy source positioned on a silicon wafer or chip, characterized in that the electrically non-conductive substrate of the batteries is part of the silicon wafer or chip.

43. The method according to claim 20, wherein in step (vii), one of (a) a second covering layer consisting of either a material as defined for the first covering layer or a second electrically conductive material which was also deposited from the gas phase or in the form of a liquid or viscous paste, and (b) a second covering layer together with further covering layers of the first or the second material is applied in such a manner that the first covering layer and the said second or said second and further covering layer(s), together with at least one of the substrate and the substrate in combination with (a) further component(s), form an encapsulation through which the battery is sealed from the surrounding environment.

44. The method according to claim 26, wherein in step (vii) one of (a) a second covering layer consisting of either a material as defined for the first covering layer or a second electrically conductive material which was also deposited from the gas phase or in form of a liquid or viscous paste, and (b) a second covering layer together with further covering layers of the first or the second material is applied in such a manner that the first covering layer and the said second or said second and further covering layer(s), together with at least one of the substrate and the substrate in combination with (a) further component(s), form an encapsulation through which the battery is sealed from the surrounding environment.

* * * * *